(12) United States Patent
Maple

(10) Patent No.: US 6,727,605 B1
(45) Date of Patent: Apr. 27, 2004

(54) DUTY CYCLE PHASE NUMBER CONTROL OF POLYPHASE INTERLEAVED CONVERTERS

(75) Inventor: Robert Maple, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 20 days.

(21) Appl. No.: 10/267,974

(22) Filed: Oct. 9, 2002

(51) Int. Cl.$^7$ ................................................ H02B 1/24
(52) U.S. Cl. ......................... 307/127; 700/298; 700/50
(58) Field of Search ........................ 307/127; 323/272, 323/283; 700/40, 50, 297, 298

(56) References Cited

U.S. PATENT DOCUMENTS

| | | |
|---|---|---|
| 5,861,734 A | 1/1999 | Fasullo et al. |
| 6,362,608 B1 | 3/2002 | Ashburn et al. |
| 6,392,418 B1 | 5/2002 | Mir et al. |
| 6,404,175 B1 | 6/2002 | Yang et al. |
| 6,429,628 B2 | 8/2002 | Nakagawa |
| 6,462,525 B1 * | 10/2002 | Chen .......................... 323/285 |
| 6,534,960 B1 * | 3/2003 | Wells et al. ................ 323/222 |
| RE38,140 E * | 6/2003 | Schaffer ....................... 363/65 |
| 6,577,097 B2 | 6/2003 | Krefta et al. |
| 6,590,369 B2 * | 7/2003 | Burstein et al. ............ 323/272 |

OTHER PUBLICATIONS

Lambert, John et al; "Optimized MOSFET's Improve 1MHz Multi–Phase Converters"; PCIM, www.pcim.com, May 2000, p. 16.
Maniktala, Sanjaya; "Current Ripple Ratio Simplifies Selection of Off–Shelf Inductors for Buck Converters"; Power Electronics Technology, www.powerelectronics.com, Oct. 2001, p. 18.

\* cited by examiner

Primary Examiner—Michael Sherry
Assistant Examiner—Gary L. Laxton
(74) Attorney, Agent, or Firm—Jimmy L. Funke

(57) ABSTRACT

Interleaved converter and method for controlling such inverter are provided. The converter includes a plurality of phasing stages. The converter further includes a calculator configured to calculate a duty cycle value of the converter. A processor is configured to receive the calculated duty cycle value. A rulebase is coupled to the processor and includes a set of phase-selection rules configured to select a respective phase number based on the: calculated duty cycle value.

8 Claims, 4 Drawing Sheets

US 6,727,605 B1

DUTY CYCLE PHASE NUMBER CONTROL OF POLYPHASE INTERLEAVED CONVERTERS

BACKGROUND OF THE INVENTION

Power converters, such as AC-to-DC and DC-to-DC converters, are known in the art. A design technique generally referred to as "multiphasing", wherein two or more switching converter stages are connected in parallel (e.g., "interleaved") to deliver power through a common output terminal, has emerged to try to alleviate the shortcomings of single-phase converters. Traditionally, such polyphase interleaved power converters have utilized a fixed number of phases to achieve the power conversion. The specific phase number is fixed to match the needs of any given application or design constraints. That is, the phase number is uniquely fixed e.g., two, three, twelve, etc.

In polyphase interleaved converters, the magnitude of the AC component of the input and output currents is functionally related to both the phase number and the PWM (Pulse-Width Modulation) duty cycle. As the PWM duty cycle changes, the magnitude of the AC component will also change. For example as shown in FIG. 1, whenever the PWM duty cycle matches the ratio of the low-side voltage of the converter relative to the high-side voltage of the converter, the AC component of the input current of the converter will have a minimum value in amplitude. FIG. 1 further illustrates the effect of phase number, not just at such minimum values of amplitude, but over the full-range of values that the duty cycle may take, e.g., duty cycle values ranging from zero to one. It can be shown that the relationships depicted in FIG. 1 between duty cycle and phase number are also equally applicable relative to the output current of the converter.

Since in any practical converter circuit the PWM duty cycle may be subject to variation due to environmental and/or operational conditions to which the circuit may be exposed to, it would be desirable to provide a converter and power conversion techniques that would allow reducing the AC component of the input and output currents regardless of variation of the PWM duty cycle.

BRIEF SUMMARY OF THE INVENTION

Generally, the present invention fulfills the foregoing needs by providing in one aspect thereof, an interleaved converter including a plurality of phasing stages. The converter further includes a calculator configured to calculate a duty cycle value of the converter. A processor is configured to receive the calculated duty cycle value. A rulebase is coupled to the processor and includes a set of phase-selection rules configured to select a respective phase number based on the calculated duty cycle value.

The present invention further fulfills the foregoing needs by providing in another aspect thereof, a method for controlling an interleaved converter. The method allows providing a plurality of phasing stages. The method further allows calculating a duty cycle value of the converter. The calculated duty cycle value is processed relative to a set of phase-selection rules. A respective phase number is selected based on the calculated duty cycle value.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

The inventor of the present invention has innovatively recognized that providing a converter configured to selectably change the number of switching stages (e.g., the number of phases), as a function of the duty cycle through which Pulse Width Modulation (PWM) is performed, would advantageously allow reducing the magnitude of the AC component of both the input and output currents of the converter, essentially over the full range of duty cycle operation.

Figure 3:
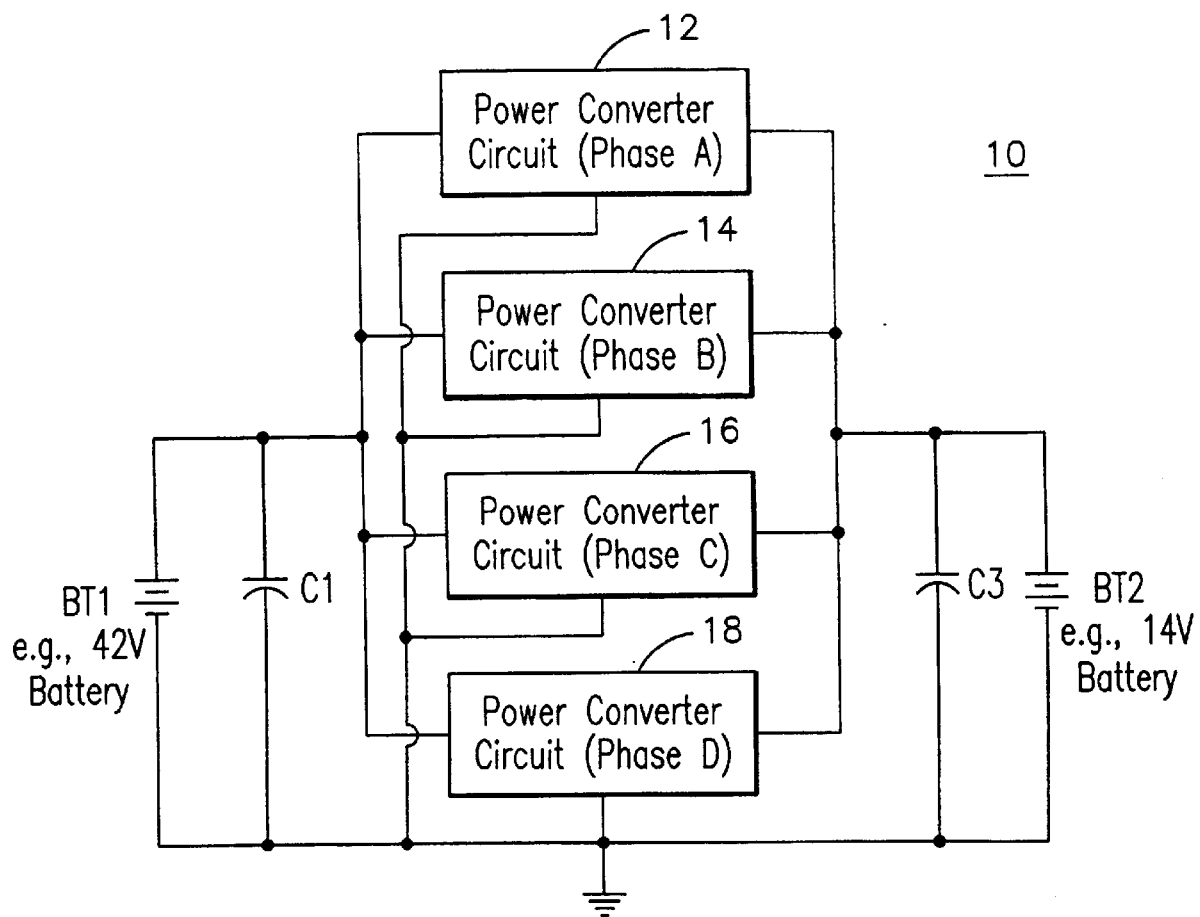
FIG. 3 illustrates an exemplary converter made up of four interleaved power converter phasing stages connected in parallel to provide power conversion.

FIG. 3 illustrates a converter 10 comprising four power converter phasing stages 12, 14, 16 and 18 connected in parallel to provide power conversion from a first DC voltage source, e.g., a 42 V battery (BT1), to a second DC voltage source, e.g., a 14 V battery (BT2). As shown in FIG. 3, a capacitor C1 is connected to provide appropriate filtering to any AC current component relative the input side of the converter. A capacitor C2 is connected to provide similar filtering to any AC current component relative to the output side of the converter. It will be appreciated that being able to reduce the magnitude of such AC current components would allow the designer to choose passive components with lower ratings, such as capacitors BT1 and BT2, and output inductor L1 (FIG. 4) thus incrementally lowering costs as well as increasing the overall reliability of the converter since such components would not be subject to the thermal stresses that otherwise would result, in the event such components had to conduct larger values of AC ripple current.

Figure 4:
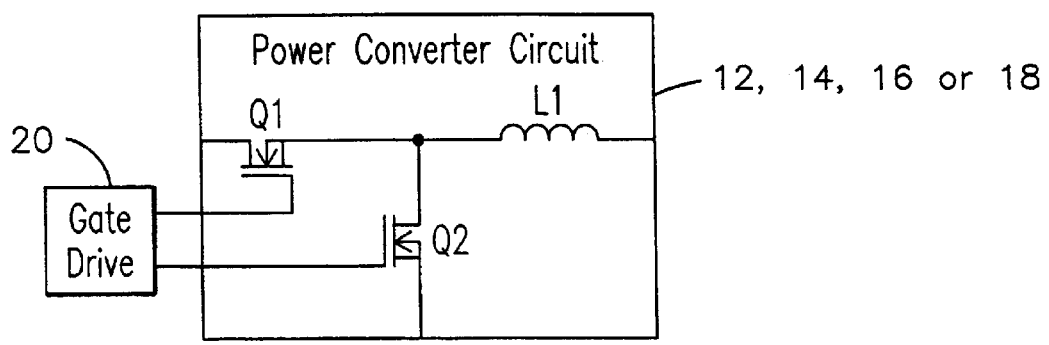
FIG. 4 illustrates one exemplary embodiment regarding any of the power converter phasing stages shown in FIG. 3.

FIG. 4 illustrates one exemplary embodiment regarding any of the power converter phasing stages 12, 14, 16 and 18. Each power converter stage includes a pair of power switches Q1 and Q2 responsive to switching signals supplied by a respective gate drive 20.

Figure 1:
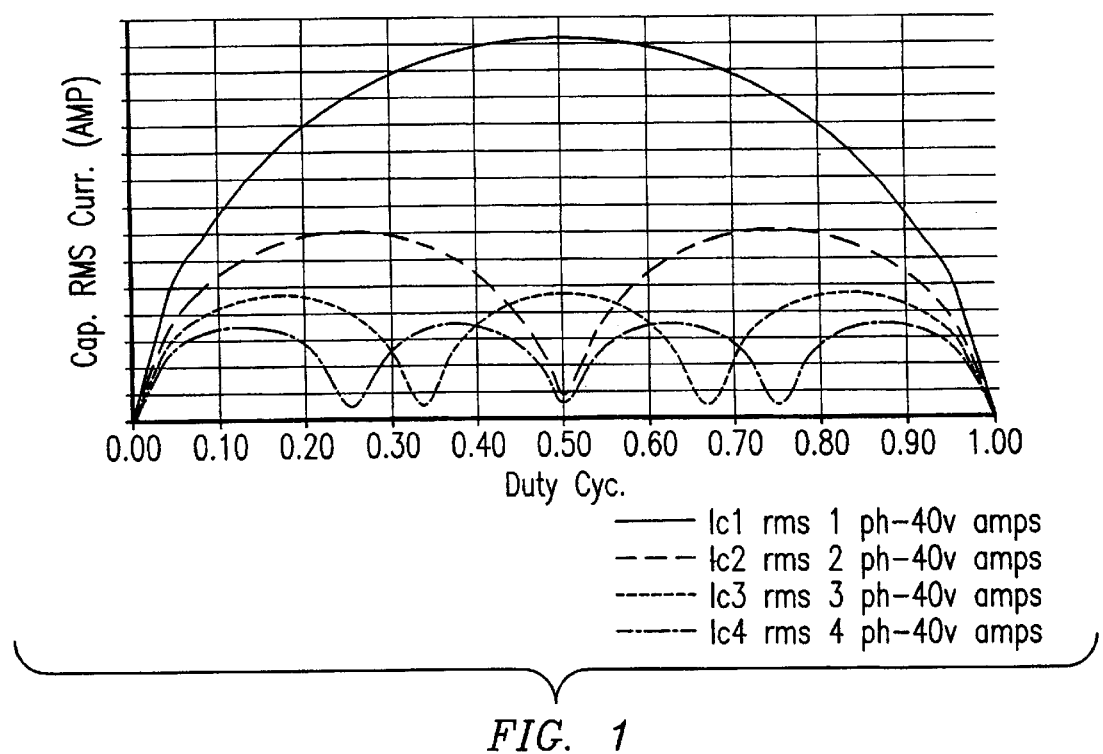
FIG. 1 illustrates respective plots of AC component in the input current of exemplary interleaved converters as a function of the value of the duty cycle of the converter.
Figure 2:
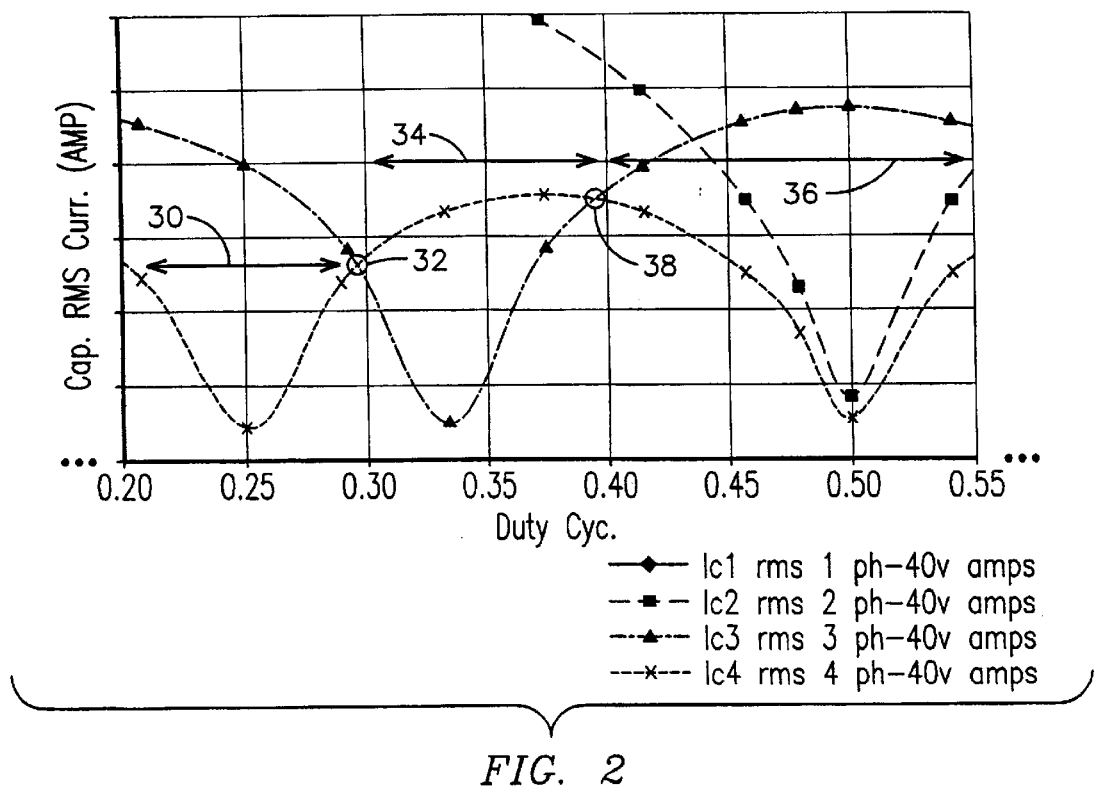
FIG. 2 is a zoomed-in view of a portion of the plots shown in FIG. 1.

FIG. 2 illustrates a zoomed-in view of the waveforms illustrated in FIG. 1. More particularly, FIG. 2 is provided to assist the reader to visualize the concept of selectably changing the phase number of the converter to achieve reduction in the values of the AC component that otherwise would have to be carried by capacitors C1 and C2 in the event of duty cycle variation. This example assumes phase number selectivity between three-phasing and four-phasing circuits. That is, in operation the converter is configured to selectably switch to a phase number of three or to a phase number of four, depending on the value of the PWM duty cycle, in order to provide relatively low RMS values of input and output current of the converter.

For the purposes of illustrating the switching points over the full range of values that may be taken by the duty cycle, the example below assumes the duty cycle incrementally changes in value from zero to one. As represented by twin-headed arrow 30, the converter would operate with a phase number of three for duty cycle values ranging up to a value of about 0.29. Node 32 represents a phase number switching point. For example, as represented by twin-headed arrow 34, when the duty cycle changes to values higher than about 0.29 but less than 0.39, in this case the converter would be configured to switch from a phase number of four to a phase number of three. Similarly, as represented by twin-headed arrow 36, when the duty cycle is above about 0.39, in this case the converter would be reconfigured to switch from a phase number of three to a phase number of four at switching point 38. It will be appreciated that the invention is not limited either to changing between just two phasing values, or to the specific values of three and four phases. That is, the number of selectable phasing values may be more than two and the specific phasing values need not be three and-four since the specific phasing selectivity may be adapted to any number of phases as may be appropriate to meet the design requirements of any given application.

Figure 5:
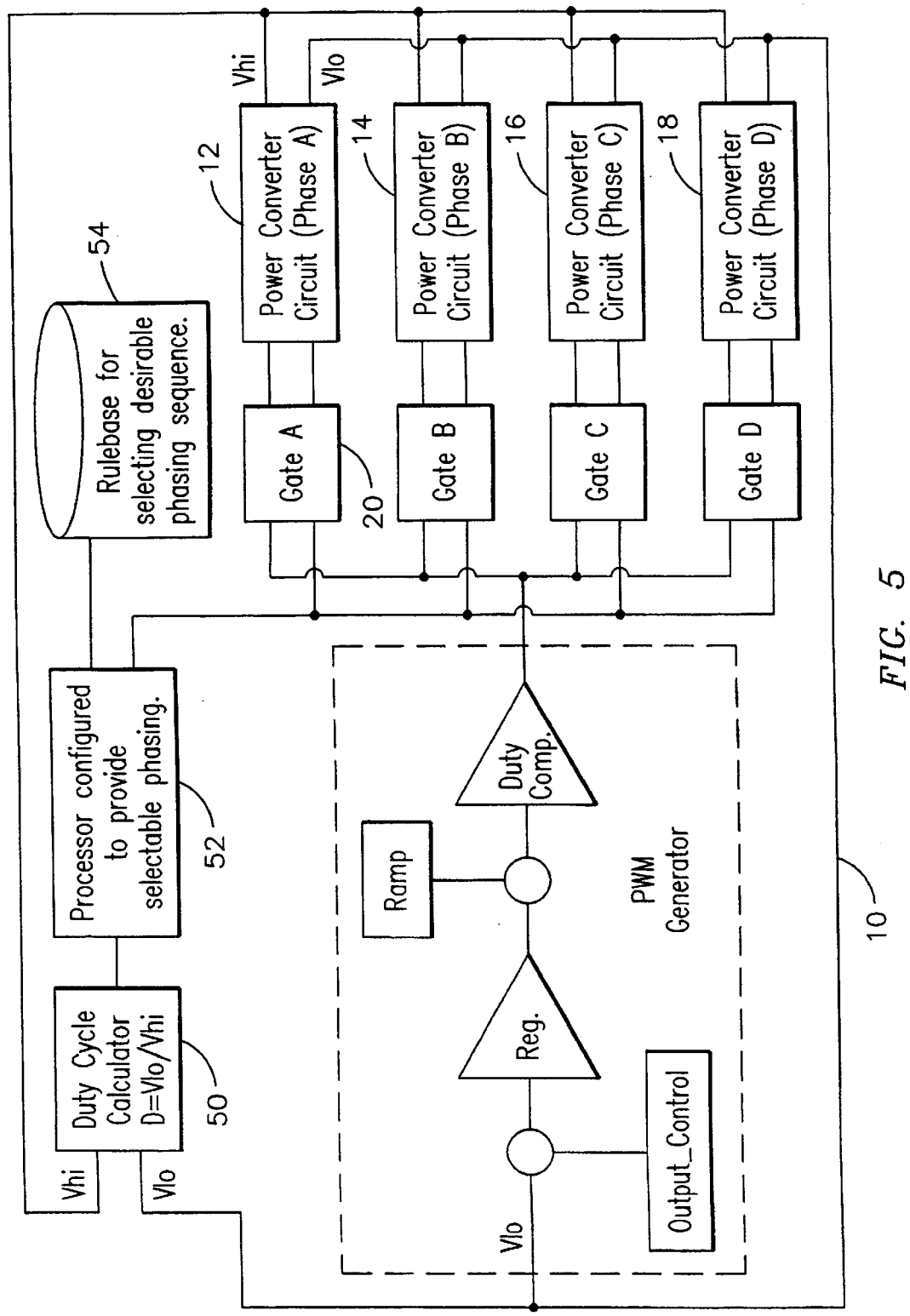
FIG. 5 illustrates circuit details of a converter embodying aspects of the present invention, i.e., capable of providing a selectable phase number as a function of PWM duty cycle value.

FIG. 5 illustrates circuit details for an exemplary embodiment of converter 10 configured to provide a selectable phase number as a function of PWM duty cycle value. A duty cycle calculator 50 is provided to calculate the value of the duty cycle, such as may be calculated based on the ratio of signals Vlo and Vhi. A processor 52 is configured to receive the duty cycle value from calculator 50 to provide selectable phasing based on the value of the duty cycle relative to a set of phasing selection rules. For example, processor 52 may be coupled to a rulebase 54 including the rules for selecting the appropriate phasing number for any given duty cycle value. For example, in reference to the relationships illustrated in FIG. 1 between phase number and duty cycle, an exemplary set of phasing selection rules that may be stored in rulebase 54 may be as follows:

0 < D < 0.29 then the phasing selection = 4
0.29. < D < 0.39 then the phasing selection = 3
0.39. < D < 0.61 then the phasing selection = 4
0.61. < D < 1 then the phasing selection = 3 wherein D represent the value of the duty cycle as may be calculated by calculator 50. It will be appreciated that the foregoing duty cycle ranges are merely illustrative of a converter having selectable phasing between three and four.

Figure 6:
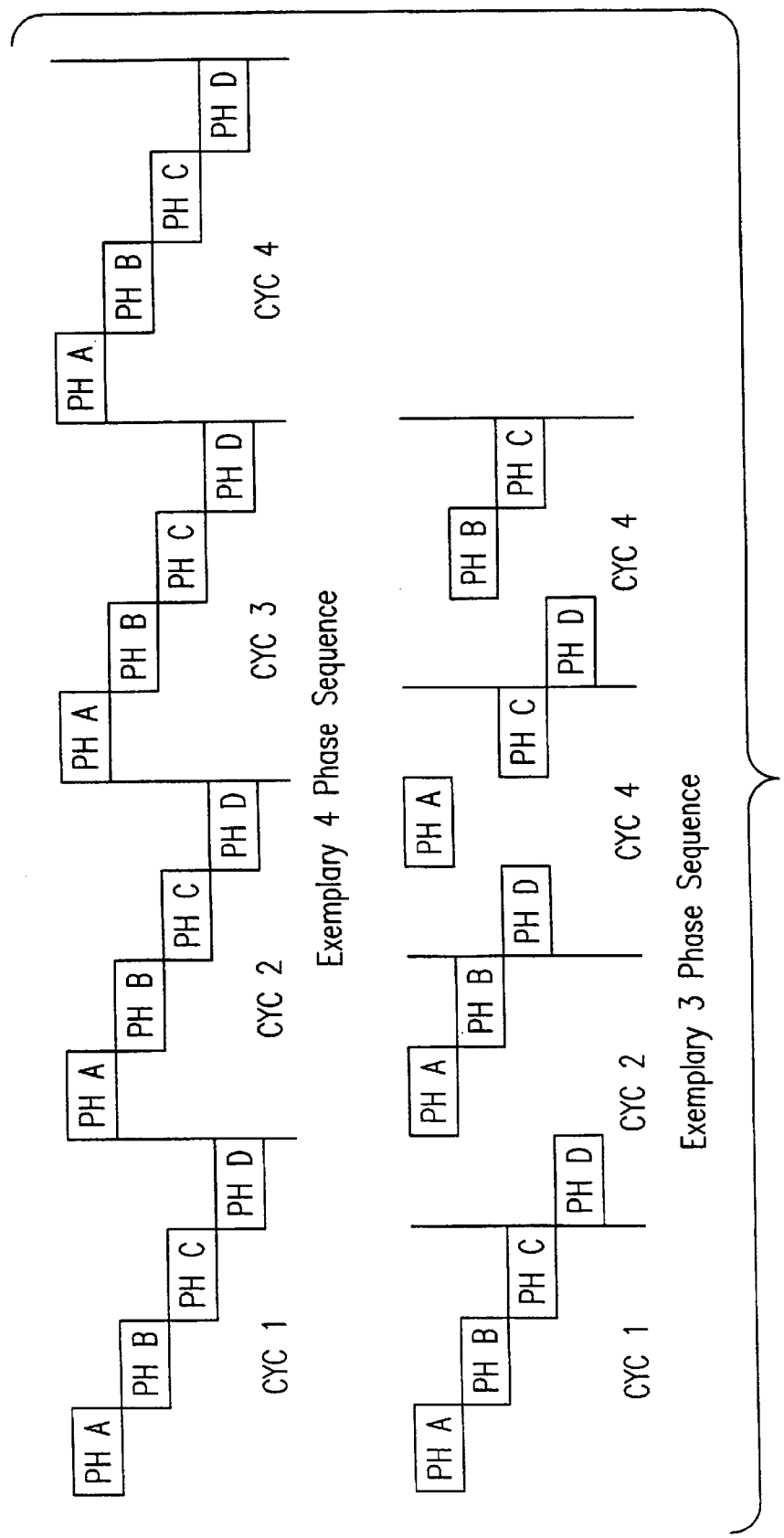
FIG. 6 illustrates exemplary sequences for energizing the phasing circuits of FIGS. 3 and 5.

FIG. 6 illustrates exemplary sequences for energizing phasing circuits 12, 14, 16 and 18. Assuming a phase number of four, a simple sequence to implement would be successively energizing phases A, B, C and D. Assuming a phase number of three, another simple sequence to implement would be phases A, B and C (not illustrated in FIG. 6). However, since there are four phasing circuits available, one practical sequence may be as exemplarily illustrated in FIG. 6, wherein each of the four phasing stages is utilized to provide a phase number of three. Thus, the latter exemplary sequence is configured so that, on the average, each of the four phasing circuits is utilized approximately the same amount of time and thus each of the four phasing circuits is utilized to provide a three-phasing sequence. It will be appreciated that the present invention is not limited to the specific sequences illustrated in FIG. 6 since those skilled in the art will now recognize many other equivalent sequences that may be used to achieve aspects of the present invention.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An interleaved converter comprising:

a plurality of phasing stages;

a calculator configured to calculate a duty cycle value of the converter;

a processor configured to receive the calculated duty cycle value; and a rulebase coupled to the processor and including a set of phase-selection rules configured to select a respective phase number based on the calculated duty cycle value, wherein the selected phase number allows reducing the magnitude of AC ripple therein.

2. The interleaved converter of claim 1 wherein the phase number is selected from the group consisting of three and four phases.

3. The interleaved converter of claim 1 wherein the set of phase-selection rules is further configured to select a respective phasing sequence consistent with the selected number of phases.

4. The interleaved converter of claim 3 wherein the selected phasing sequence is selected so that each of the plurality of phasing stages is on an average energized substantially the same relative to one another.

5. A method for controlling an interleaved converter, the method comprising:

providing a plurality of phasing stages;

calculating a duty cycle value of the converter;

processing the calculated duty cycle value relative to a set of phase-selection rules; and selecting a respective phase number based on the calculated duty cycle value, wherein the selected phase number allows reducing the magnitude of AC ripple therein.

6. The method of claim 5 further comprising selecting the phase number from the group consisting of three and four phases.

7. The method of claim 5 wherein the set of phase-selection rules is further configured to select a respective phasing sequence consistent with the selected number of phases.

8. The method of claim 7 further comprising selecting the phasing sequence so that each of the plurality of phasing stages is on an average energized substantially the same amount of time relative to one another.

* * * * *